April 21, 1959 J. E. WOODS 2,883,143
SYSTEM FOR CONTROLLING FLOW OF CIRCULATING FLUID
Filed March 5, 1956
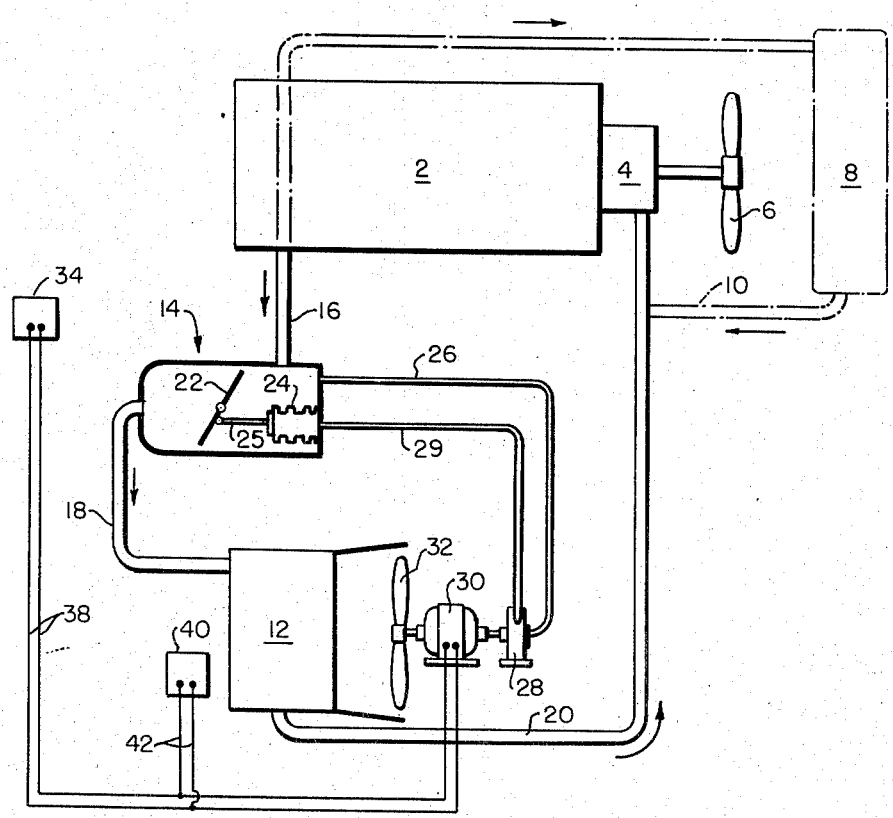
INVENTOR.
JOHN E. WOODS
BY
ATTORNEYS

United States Patent Office 2,883,143
Patented Apr. 21, 1959

2,883,143
SYSTEM FOR CONTROLLING FLOW OF CIRCULATING FLUID

John E. Woods, Cohasset, Mass., assignor to Standard-Thomson Corporation, Waltham, Mass., a corporation of Delaware Application March 5, 1956, Serial No. 569,335

2 Claims. (Cl. 251—57)

The present invention relates to a system for controlling the flow of fluid, and more particularly to a butterfly-type valve control having actuating means for the valve member situated within the fluid system.

In many valve applications the difficulty of obtaining a fluid-tight fit about a valve spindle or comparable member becomes very pronounced, especially when the valve is operated at exceedingly high temperatures. In my Patent 2,656,114 there is disclosed a fluid control system for operating a substantially balanced poppet-type valve for automotive cooling, wherein the valve member is actuated by an expansible member situated entirely within the fluid circulating system. The expansible member is in turn subjected to variable pressure by a fluid pump. While the temperatures reached in such a system are relatively moderate compared with many modern applications, the structure has an important advantage in that the valve member is not mechanically connected through a stuffing box or rotary seal with a point external to the valve housing for purposes of actuation. It is an object of the present invention to provide a butterfly valve having this same advantage.

However, the valve of my above-mentioned patent includes an actuating bellows for the valve member that has substantially the same effective area as the valve seat, and the substantial balance of the forces operative upon the valve member when the circulating pump is stopped depends upon this feature. In applications where it is desired to control relatively large volumes of fluid the necessity of providing a bellows or similar unit of substantially equal effective area to that of the valve seat would entail a prohibitively large bulk, and correspondingly increase the cost of manufacture. An additional object of the present invention is to provide a valve which is not subject to this dimensional restriction with respect to the effective area of the actuating bellows or similar expansible member. Accordingly, while securing the benefits of a balanced system, it is desired to provide an expansible member of a different and preferably substantially smaller size than the valve seat.

With the foregoing and other objects in view, a feature of the present invention resides in the provision of a butterfly-type valve with a pump-operated expansible member situated directly within the circulating-fluid system.

Another feature resides in the fact that the internal and external pressures operative upon the expansible member are in balance when the actuating pump is stopped. Correspondingly, the butterfly-type valve member is itself inherently substantially in balance.

Other features of the invention reside in certain features of construction, combinations of the parts and modes of operation which will be more readily understood from the following description of a preferred embodiment thereof, and from the appended drawing illustrating the same.

The accompanying drawing is a diagram illustrating what is now considered the preferred form of the invention as applied to an automotive heater.

The engine is shown at 2, the water pump at 4 and the radiator fan at 6. The water circulation system for engine cooling is indicated by the radiator 8 and the lines 10, which parts are shown in dot-and-dash lines since they form no part of the present invention. Water is also circulated from the engine jacket by the pump 4 through a heater radiator 12 and a valve 14. To this end the line 16 connects from the engine jacket to the inlet of the valve 14, a line 18 between the valve outlet and the heater 12, and a line 20 between the heater and the pump 4. The valve 14 comprises a body enclosing a butterfly valve 22 adapted to be actuated by a suitably closed expansible member, shown as a bellows 24 in the inlet portion of the body. The bellows and valve member are operatively connected by an arm 25. A branch line 26 connects the inlet side of the valve with the inlet of a small centrifugal pump 28 and the outlet of the pump is connected to the interior of the bellows 24 through a line 29. The bellows 24 is always filled with water. When the pump is not operating, the bellows is substantially balanced since both the interior and exterior walls of the bellows are exposed to the inlet pressure. As will be appreciated by those skilled in the art, a butterfly valve is inherently in substantial balance, and hence the connected system comprising the valve 22 and the bellows 24 is substantially in balance with the pump 28 shut off, regardless of the position of the valve 22.

In contrast to the system of said patent, the valve and bellows are individually balanced, rather than being unbalanced equally and oppositely, whereby it is possible for the bellows 24 to have a much smaller effective area than the valve seat. This permits controlling a very large flow of fluid with a relatively small bellows, and indeed the size of the bellows is preferably determined exclusively by independent considerations such as the expected life, the angle through which the valve is to be turned from full-open to closed position, and the available space within the valve body.

The bellows is preferably contracted to slightly less than its normal free length when the valve is closed, so that the contraction of the bellows holds the valve against its seat. (Or the bellows may be set at substantially its free length when the valve is closed, in which case a light spring is used to hold the valve seated.) In any event, the interior and exterior of the bellows are subjected to the same pressure of the circulating fluid. When the pump is driven, however, the pump pressure overcomes the balanced pressure and expands the bellows, thereby rotating the valve from its seat and permitting the water to flow through the heater.

The pump is driven by a small electric motor 30 which also preferably drives a small fan 32 for directing heated air through the heater 12 into the interior of the vehicle. A thermostatic switch 34, which may be of any suitable construction, is connected by wires 38 with the motor 30. The switch may be an on-and-off switch whereby the motor will be started when there is a demand for heat and shut off when no heat is called for, or it may be a modulating type of switch whereby the speed of the motor may be varied in accordance with the temperature in the vehicle. In the latter case, the valve 22 will be opened and closed by varying amounts and the fan 32 will be driven at a variable speed depending upon the amount of heat called for by the car. It will be observed that the thermostat may be placed in any suitable position in the car and that the wire connections 38 may be readily run from such position to the motor.

For automotive operation, it is desirable to prevent drafts of cold air, when the car body is at a temperature sufficient to cut off water flow through the heater. To this end a second thermostatic switch 40 is placed at the outlet of the heater and is connected by wires 42 with the wires 38 that lead to the motor, as described in said patent.

A feature particularly useful for automative heating is that the control valve and the small centrifugal pump which operates it are included in one assembly with the car heater motor and fan assembly, and also described in said patent.

While the invention has been described as applied to an automotive heater, its application is by no means limited thereto. Thus the flow of fluids other than cooling liquid may be controlled by the valve. For example, the system is useful for controlling the flow of air or other gases, and in many modern systems of this latter type, such as pneumatic controls, exceedingly high temperatures of the gas or environment are encountered. Especially for these high temperature applications, the peculiar advantages of the present invention include the fact that no rotary seals, piston rings, stuffing boxes or similar fluid-tight fittings are required for actuation of the valve member. It will be understood that these and other applications of the invention to fluid control systems which would occur to those skilled in the art upon a reading of the foregoing specification, as well as variations from the disclosed structure similarly within the scope of a skilled artisan, are therefore also within the spirit and scope of the invention.

Having thus described the invention, I claim:

1. A control for a circulating-liquid system comprising a valve body in the system having an inlet and an outlet, a butterfly valve member in the body between said inlet and said outlet, a closed expansible member in the valve body at the inlet side of the valve member, an operating connection between the wall of the expansible member and the valve member, a branch line leading from the inlet side of the valve member to the interior of the expansible member to maintain said expansible member filled with circulating-liquid medium, the expansible member being thereby subjected to substantially balanced pressure, and a pump in the branch line to force additional liquid medium into the expansible member to expand it and to operate the valve member.

2. A control for a circulating-fluid system comprising a valve body in the system having an inlet and an outlet, a butterfly valve member in the body between said inlet and said outlet, a closed expansible member in the system, an operating connection within the system between the wall of the expansible member and the valve member, a branch line leading from the same side of the valve member as the expansible member to the interior thereof to maintain said expansible member filled with circulating-fluid medium, the expansible member being thereby subjected to substantially balanced pressure, and a pump in the branch line to force additional fluid medium into the expansible member to expand it and to operate the valve member.

References Cited in the file of this patent

UNITED STATES PATENTS

| 907,771 | Fulton | Dec. 29, 1908 |
| 2,264,989 | Lee | Dec. 2, 1941 |
| 2,656,114 | Woods | Oct. 20, 1953 |

FOREIGN PATENTS

| 507,371 | Germany | Sept. 15, 1930 |
| 39,402 | France | Aug. 11, 1931 |